Reissued Dec. 11, 1934

Re. 19,394

UNITED STATES PATENT OFFICE 19,394

METHOD OF TREATING CHLORATES FOR BLASTING PURPOSES AND PRODUCT THEREOF

Leonid Ivanoff, Helsingfors, and Per Olov Björkman, Tainionkoski, Finland

No Drawing. Original No. 1,899,076, dated February 28, 1933, Serial No. 494,806, November 10, 1930, and in Sweden May 8, 1928. Application for reissue May 12, 1934, Serial No. 725,396

5 Claims. (Cl. 52—12)

This invention relates to an improved method of treating chlorates for blasting purposes and the briquette product of said method.

It is already known to use for blasting purposes oxidizing substances, such as for instance chlorates, and to mix them immediately before the use with combustible substances, such as for instance combustible liquids. The manufacture of such explosives as well as their transport and use is quite as safe as the manufacture and use of pure chlorate due to the fact that the two ingredients of the explosive are transported and stored separately. According to the known methods it was, however, not possible to produce a perfectly good explosive and especially it was troublesome to bring together the ingredients of the explosive in the desired proportions.

The chief object of this invention is to bring the chlorate into a form which is well suited for use in the manufacture of explosives consisting of chlorate as oxidizing agent and a combustible agent.

The invention consists, chiefly, in this that the chlorate with or without additions which do not make the mixture explosive per se is brought to a finely divided or dusty and moist state and then compressed and dried under heating, thus cementing the chlorate grains together to solid porous briquettes the porosity of which amounts at least to 10% by volume. The desired porosity is obtained by suitably selecting the pressure used, the fineness of the chlorate, its natural or artificial percentage of moisture and the quantity of other additions possibly used. The chlorate used may consist of potassium chlorate, sodium chlorate or any other chlorate or perchlorate hitherto used for blasting purposes.

Before the chlorate is moulded into briquettes it is disintegrated to such a fineness that at least 90% of the powder passes through a sieve with 80 to 100 meshes pr. cm. Immediately before the use of the briquettes for blasting purposes they are impregnated with combustible substances in the form of liquids, solutions or melts until they are partly or wholly saturated therewith.

The briquettes are, preferably, coated at the moulding or afterwards with one or more envelopes adhering to the surface as a protecting cover during transport and storing. The briquettes are, preferably, made tubular in such manner that they are provided with one or more channels for the purpose of facilitating the absorption of the combustible substances and the introduction of a detonator.

The impregnation of the briquettes is, preferably, carried out in such manner that the briquettes are charged into a vessel, vat or the like, containing the combustible liquid which then in a few minutes is absorbed by the briquettes. The maximum quantity of liquid absorbed is determined beforehand by the porosity of the briquettes but it may be regulated at will by dipping the briquettes into the liquid only for a more or less short period. In such manner also the explosive power is regulated. Only after said impregnation which is effected in a few minutes the briquette is a finished explosive which may be brought to explode only by a powerful detonator (No. 6 or No. 8). The briquettes are in other respects quite safe, i. e. insensible to heat and to mechanical stress. If they for instance are held in a flame before the impregnation they only melt as a stick of sealing wax and in impregnated state they burn without exploding. The risk at the handling of the explosive is thus practically limited to the moment of charging or the moment of explosion.

As impregnating liquid any combustible liquid or solution may be used, as for instance petroleum and other liquid hydrocarbons, benzol, nitrobenzol, creosote oil, syrup, solutions of resin in alcohol, etc. Also combustible solid or half-solid substances may be used if they in molten state can be absorbed by the briquettes. Substances of the latter kind are for instance paraffin and other solid or semi-solid hydrocarbons and they may be used especially for the manufacture of explosives for blasting in water or in watery borings. By a suitable choice of liquid and the quantity thereof the explosive may be suited to different purposes and for obtaining the most suitable blasting effect. The explosive may thus be obtained either with properties like those of black gun-powder with its slow combustion or like that of dynamite with its rapid decomposition. The chlorate briquettes according to the invention may, therefore, be regarded as a universal explosive.

In order to obtain briquettes of a good and uniform quality it is suitable to reduce the internal friction of the mass and thus increase its plasticity. This may be done by adding substances such as an aqueous extract of peat, oils, gelatinous precipitates, tannin, graphite, kieselguhr, etc., to the mass before or during its moulding to briquettes. By the addition of substances which at the drying of the briquettes shrink, for instance by loss of gases or water, or are gasified, for instance volatile substances such as ammonium carbonate and the like, the briquettes can obtain the desired porosity.

The detonation speed may be increased by the addition to the mass before or during its moulding of substances which at the use of the briquettes catalytically accelerate the decomposition of the chlorate or increase the combustion and explosion temperature. Such catalytically acting substances are for instance compounds of iron, copper, cobalt, nickel, chromium and manganese, graphite, cyanides and sulphocyanides, etc., while carbides, certain metal powders such as powder of aluminium, magnesium, silicon or silicon metals, etc., may be used as energy delivering means. It is, however, to be noted that said additions should be used in such quantities only that the dried and unimpregnated briquettes maintain the desired porosity and do not become explosive per se. A suitable manner of incorporating such additional substances in the briquettes is to add them to the powdered chlorate as suspensions, emulsions, colloidal or molecular-dispersoidal solutions or to precipitate them in the chlorate powder during the mixing operation.

Another manner of introducing for instance the catalytically acting substances or substances having a high caloric value is to suspend such substances colloidally or in other manner in the combustible liquids, solutions or melts with which the briquettes are to be impregnated.

The explosive power of the briquettes may be regulated not only by the nature and the quantity of impregnating liquid used but also by the choice of detonating means and its quantity.

What we claim is:

1. Method of treating chlorates for blasting purposes, which comprises mixing finely disintegrated chlorate and water to form a plastic mass, moulding said mass into blocks, drying said blocks until the chlorate dissolved crystallizes out and cements together the chlorate powder to porous briquettes having capillarity and adapted to be impregnated with a combustible liquid, the quantity of water used being so related to the chlorate that the pore volume of the finished porous briquette amounts to at least 10% of the total volume of the briquette.

2. Method of treating chlorates for blasting purposes, which comprises mixing finely disintegrated chlorate and water to form a plastic mass, moulding said mass into blocks while applying pressure to compress the mass, drying said blocks until the chlorate dissolved crystallizes out and cements together the chlorate powder to porous briquettes having capillarity and adapted to be impregnated with a combustible liquid, the quantity of water and the pressure used being so chosen that the pore volume of the finished porous briquette amounts to at least 10% of the total volume of the briquette.

3. Method of treating chlorates for blasting purposes, which comprises mixing finely disintegrated chlorate, water and a substance which shrinks by drying, to form a plastic mass, moulding said mass into blocks, drying said blocks until the chlorate dissolved crystallizes out and cements together the chlorate powder to porous briquettes adapted to be impregnated with a combustible liquid, the quantity of water being so related to the other ingredients of the plastic mass that the pore volume of the finished porous briquette amounts to at least 10% of the total volume of the briquette.

4. Method of treating chlorates for blasting purposes, which comprises mixing finely disintegrated chlorate, water and a solid volatile substance to form a plastic mass, moulding said mass into blocks, heating said blocks to expel the water and the volatile substance and to cement together the chlorate powder to porous briquettes adapted to be impregnated with a combustible liquid, the quantities of water and of the volatile substance being so related to the chlorate that the pore volume of the finished porous briquette amounts to at least 10% of the total volume of the briquette.

5. As a new article of manufacture a chlorate briquette for blasting purposes composed of powdered particles of chlorate cemented together by fine crystalline particles of chlorate forming a solid coherent body of desired porosity such that the pore volume is predetermined and amounts to at least 10% of the total volume of the briquette.

LEONID IVANOFF.
PER OLOV BJÖRKMAN.